US010621244B2

(12) United States Patent
Ayoub et al.

(10) Patent No.: US 10,621,244 B2
(45) Date of Patent: *Apr. 14, 2020

(54) SYNCHRONIZING HTTP REQUESTS WITH RESPECTIVE HTML CONTEXT

(71) Applicant: International Business Machines Corporation, Armonk, NY (US)

(72) Inventors: Khalil A. Ayoub, Kanata (CA); Paul Ionescu, Kanata (CA); Gil Mirmovitch, Rehovot (IL); Iosif Viorel Onut, Kanata (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 66 days.

This patent is subject to a terminal disclaimer.

(21) Appl. No.: 15/397,216

(22) Filed: Jan. 3, 2017

(65) Prior Publication Data

US 2017/0116336 A1 Apr. 27, 2017

Related U.S. Application Data

(63) Continuation of application No. 14/026,246, filed on Sep. 13, 2013, now Pat. No. 9,569,534.

(30) Foreign Application Priority Data

Sep. 14, 2012 (CA) .................... 2789909

(51) Int. Cl.
*G06F 17/30* (2006.01)
*G06F 16/951* (2019.01)
(Continued)

(52) U.S. Cl.
CPC ........ *G06F 16/951* (2019.01); *G06F 16/2255* (2019.01); *G06F 16/986* (2019.01); *H04L 67/02* (2013.01)

(58) Field of Classification Search
CPC .......... G06F 17/30864; G06F 17/3033; G06F 17/30896
See application file for complete search history.

(56) References Cited

U.S. PATENT DOCUMENTS 6,584,569 B2 * 6/2003 Reshef .................. G06F 21/554
709/203
7,373,524 B2 5/2008 Motsinger et al.
(Continued)

FOREIGN PATENT DOCUMENTS

WO 2008054849 A2 5/2008
WO WO 2008054849 A2 * 5/2008 ......... H04L 63/0876

OTHER PUBLICATIONS

Christ et al., "What is a hash map in programming and where can it be used," Apr. 7, 2010, http://stackoverflow.com/questions/2592043/what-is-a-hash-map-in-programming-and-where-can-it-be-used.*
Barla, M. et al., "Estimation of User Characteristics Using Rule-Based Analysis of User LOGS," [online] In Proc. of Int'l Conf. on User Modeling, Data Mining for User Modeling Workshop, pp. 5-14, Jun. 2007 [retrieved Sep. 13, 2013] retrieved from the Internet: <http://mapekus.fiit.stuba.sk/misc/UM07_DMWorkshop_barla-bielik.pdf>, 10 pg.
(Continued)

*Primary Examiner* — Mark D Featherstone
*Assistant Examiner* — Navneet Gmahl
(74) *Attorney, Agent, or Firm* — Cuenot, Forsythe & Kim, LLC (57) ABSTRACT

Synchronizing requests with a respective context includes, responsive to a determination that there are more pages to explore, performing regular crawling operations for a current page, recording a current page in a list of explored pages and extracting links from the current page. Responsive to a determination that there are more links to extract, a next link to analyze is selected to form a selected link and responsive to a determination that there is a new request associated with the selected link, a new request identifier is created and saved as an entry in a hashmap. Responsive to a determination that there is not a new request associated with
(Continued)

selected link, a request associated with the selected link is updated with a new link value when the link value differs.

15 Claims, 7 Drawing Sheets

(51) Int. Cl.
    *G06F 16/958*     (2019.01)
    *G06F 16/22*     (2019.01)
    *H04L 29/08*     (2006.01)

(56) References Cited

U.S. PATENT DOCUMENTS

| | | | |
|---|---|---|---|
| 7,934,253 | B2 | 4/2011 | Overcash et al. |
| 8,473,845 | B2 | 6/2013 | Igelman et al. |
| 8,478,052 | B1* | 7/2013 | Yee .................. G06K 9/4676 382/155 |
| 2002/0010855 | A1 | 1/2002 | Reshef et al. |
| 2002/0129014 | A1 | 9/2002 | Kim et al. |
| 2005/0165778 | A1* | 7/2005 | Obata ............... G06F 17/30864 |
| 2005/0198300 | A1 | 9/2005 | Gong et al. |
| 2006/0074910 | A1 | 4/2006 | Yun et al. |
| 2007/0033264 | A1 | 2/2007 | Edge et al. |
| 2009/0234838 | A1* | 9/2009 | Li ..................... G06F 17/30864 |
| 2011/0016528 | A1 | 1/2011 | Zhou et al. |
| 2011/0270820 | A1* | 11/2011 | Agarwal .............. G06F 17/273 707/709 |
| 2012/0173966 | A1* | 7/2012 | Powell ............... G06Q 30/0241 715/234 |
| 2012/0203747 | A1* | 8/2012 | Douetteau ......... G06F 17/30911 707/696 |
| 2013/0332460 | A1* | 12/2013 | Pappas ............. G06F 17/30705 707/740 |
| 2014/0081945 | A1 | 3/2014 | Ayoub et al. |
| 2014/0108667 | A1* | 4/2014 | Reddy ............... G06F 17/30873 709/228 |

OTHER PUBLICATIONS

Berendt, B., "Context, (E) Learning, and Knowledge Discovery for Web User Modeling: Common Research Themes and Challenges," [online] In On-Line Proc. of Data Mining for User Modeling Workshop, p. 15, Jun. 2007, [retrieved Sep. 13, 2013] retrieved from the Internet: <http://www.educationaldatamining.org/UM2007/Berendt.pdf>, 13 pg.

Webb, S. et al., "Characterizing Web Spam Using Content and HTTP Session Analysis," [online] In Proc. of 4th Conference on Email and Anti-Spam (CEAS '07), Aug. 2007 [retrieved Sep. 13, 2013], retrieved from the Internet: <http://faculty.cs.tamu.edu/caverlee/pubs/webb07characterizing.pdf>, 9 pg.

Kirda, E. et al., "Client-Side Cross-Site Scripting Protection," [online] In Proc. of 2006 ACM Symposium on Applied Computing, pp. 330-337, Apr. 2006, [retrieved Sep. 13, 2013], retrieved from the Internet: <http://www.iseclab.org/papers/noxes_journal.pdf>, 8 pg.

Sternsek, G. et al., "A User Profile Derivation Approach Based on Log-File Analysis," [online] In Proc. of Int'l. Conf. on Information and Knowledge Engineering, Jun. 2007, [retrieved Sep. 13, 2013], retrieved from the Internet: <http://wi.wu-wien.ac.at/home/mark/publications/ike07.pdf>, 8 pg.

Chris et al., "What is a Hash Map in Programming and Where Can It Be Used," [online] Stack Exchange, Inc. © 2017, Apr. 7, 2010, [retrieved Jan. 3, 2017] retrieved from the Internet: <http://stackoverflow.com/questions/2592043/what-is-a-hash-map-in-programming-and-where-can-it-be-used>, 2 pg.

U.S. Appl. No. 14/026,246, Non-Final Office Action, dated Jan. 6, 2016, 7 pg.

U.S. Appl. No. 14/026,246, Final Office Action, dated Jul. 19, 2016, 9 pg.

U.S. Appl. No. 14/026,246, Notice of Allowance, dated Oct. 4, 2016, 5 pg.

\* cited by examiner

Synchronization system 300

SYNCHRONIZING HTTP REQUESTS WITH RESPECTIVE HTML CONTEXT

CROSS-REFERENCE TO RELATED APPLICATIONS

This application claims the benefit of Canada Application Number 2789909 filed on Sep. 14, 2012, which is fully incorporated herein by reference.

BACKGROUND

During dynamic analysis of web applications for security issues attacks on hypertext transport protocol (HTTP) requests are typically executed disconnected from an HTML object from which the HTTP requests were generated. The disconnected execution is performed for performance reasons and to eliminate any validations performed by the code of the web page. For example, rather than entering a cross site scripting payload in a text box of a search form and clicking on a search button, a scanner tests an HTTP request directly and repeatedly as in the statement: GET /search.jsp?query=<script>alert(1)</script>.

However the approach used in the example can cause problems when an HTTP request taken out of context has a dependency on the HTML from which it originated.

A typical example of this situation occurs when links are updated in the HTML with a new session identifier as in the following statement: <a href="/search,jsessionid=1234?profile=jsmith">Profile</>. In this example, HTTP requests disconnected from the HTML are sent with an invalid jsessionid value and are receive Out of Session messages.

Web application scanners typically provide a solution for the situation of the example in a simplistic manner. Typically scanners have a configuration setting instructing the scanner that jsessionid is a session identifier and when the scanner processes a response the scanner searches the response for the jsessionid value and updates all the requests with a new value identified.

The solution however requires expert knowledge and many complicated heuristics to identify session identifiers that the scanner has not predefined. In another example a web application uses a unique identifier to identify links. The identifier is referred to as sessnav because the identifier controls navigation for each session. Links are then defined as follows:

http://site.com/index?sessnav=1234
http://site.com/index?sessnav=9762
http://site.com/index?sessnav=3242

Each link has a different sessnav value and a link changes whenever a user logs into a session. Using current solutions of updating the sessnav identifier from the HTML (which is disconnected) would update sessnav with the first encountered value of 1234 for all links, which would accordingly be an incorrect setting for the remaining link references.

BRIEF SUMMARY

According to one embodiment, a computer-implemented process for synchronizing requests with a respective context, responsive to a determination that there are more pages to explore, performs regular crawling operations for a current page, records a current page in a list of explored pages and extract links from the current page. Responsive to a determination that there are more links to extract, selects a next link to analyze to form a selected link and responsive to a determination that there is a new request associated with the selected link, creates a new request identifier and saves an entry in a hashmap. Responsive to a determination that there is not a new request associated with selected link, updates a request associated with the selected link with a new link value when the link value differs.

According to another embodiment, a computer program product for synchronizing requests with a respective context includes a computer-readable data storage medium containing computer executable program code stored thereon. The computer executable program code includes computer executable program code for responsive to a determination that there are more pages to explore, performing regular crawling operations for a current page; computer executable program code for recording the current page in a list of explored pages; computer executable program code for extracting links from the current page; computer executable program code responsive to a determination that there are more links to extract, for selecting a next link to analyze to form a selected link; computer executable program code for determining whether there is a new request associated with the selected link; computer executable program code responsive to a determination that there is a new request associated with the selected link, for creating a new request identifier and saving an entry in a hashmap; and computer executable program code responsive to a determination that there is not a new request associated with selected link, for updating a request associated with the selected link with a new link value when the link value differs.

According to another embodiment, an apparatus for synchronizing requests with a respective context includes a memory containing computer executable program code and a processor unit coupled to the memory. The processor unit executes the computer executable program code to direct the apparatus responsive to a determination that there are more pages to explore, to perform regular crawling operations for a current page, record the current page in a list of explored pages and extract links from the current page. Responsive to a determination that there are more links to extract, the processor unit executes the computer executable program code to direct the apparatus to select a next link to analyze to form a selected link and determine whether there is a new request associated with the selected link. Responsive to a determination that there is a new request associated with the selected link, the processor unit executes the computer executable program code to direct the apparatus to create a new request identifier and saving an entry in a hashmap and responsive to a determination that there is not a new request associated with selected link, update a request associated with the selected link with a new link value when the link value differs.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

This disclosure relates generally to processing requests using a markup language in a data processing system and more specifically to associating correct session information with hypertext transport protocol (HTTP) requests in the data processing system.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer-readable program code embodied thereon.

Any combination of one or more computer-readable data storage medium(s) may be utilized. A computer-readable data storage medium may be, for example, but not limited to, an electronic, magnetic, optical, or semiconductor system, apparatus, or device, or any suitable combination of the foregoing. More specific examples (a non-exhaustive list) of the computer-readable data storage medium would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device or any suitable combination of the foregoing. In the context of this document, a computer-readable data storage medium may be any tangible medium that can contain, or store a program for use by or in connection with an instruction execution system, apparatus, or device.

A computer-readable signal medium may include a propagated data signal with the computer-readable program code embodied therein, for example, either in baseband or as part of a carrier wave. Such a propagated signal may take a variety of forms, including but not limited to electro-magnetic, optical or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wire line, optical fiber cable, RF, etc. or any suitable combination of the foregoing.

Computer program code for carrying out operations for aspects of the present disclosure may be written in any combination of one or more programming languages, including an object oriented programming language such as Java®, Smalltalk, C++, or the like and conventional procedural programming languages, such as the "C" programming language or similar programming languages. Java and all Java-based trademarks and logos are trademarks of Oracle, and/or its affiliates, in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Figure 1:
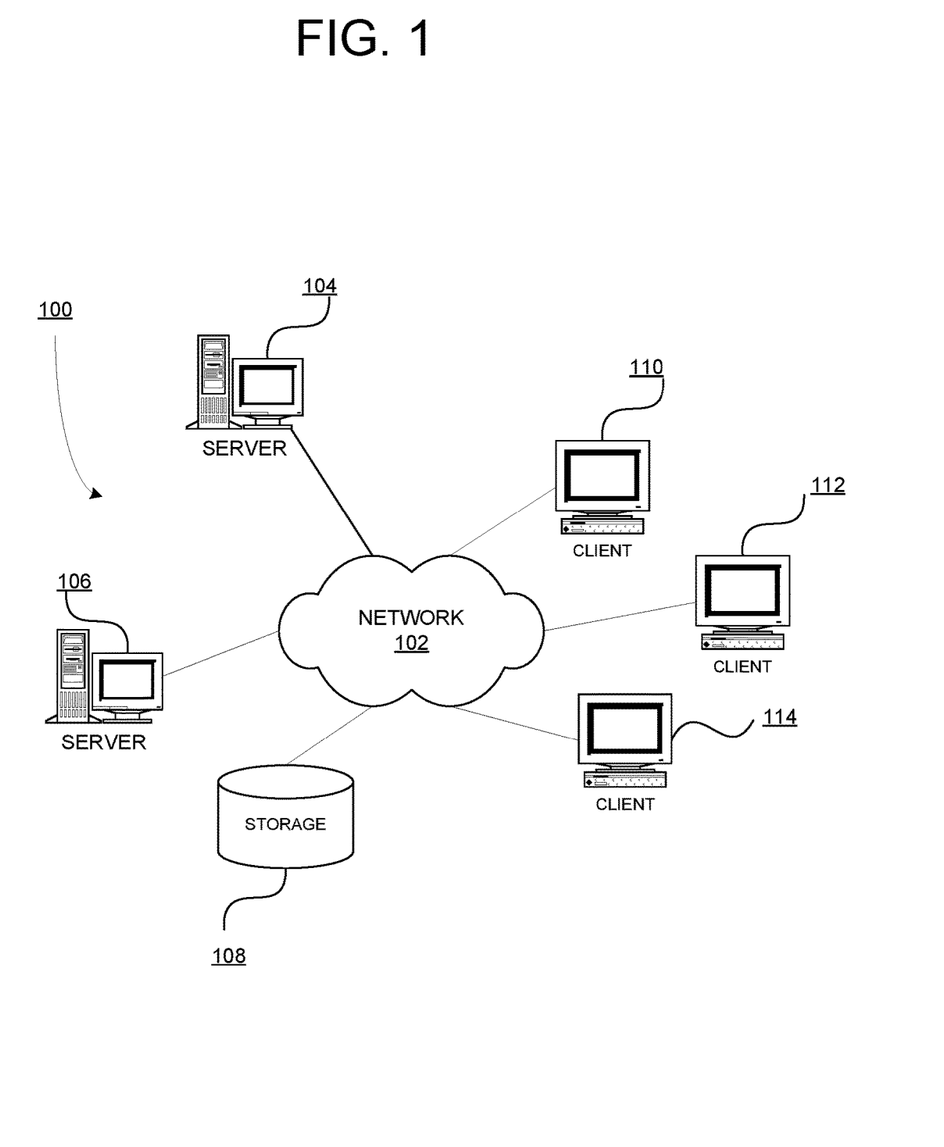
FIG. 1 is a block diagram of an exemplary network data processing system operable for various embodiments of the disclosure.
Figure 2:
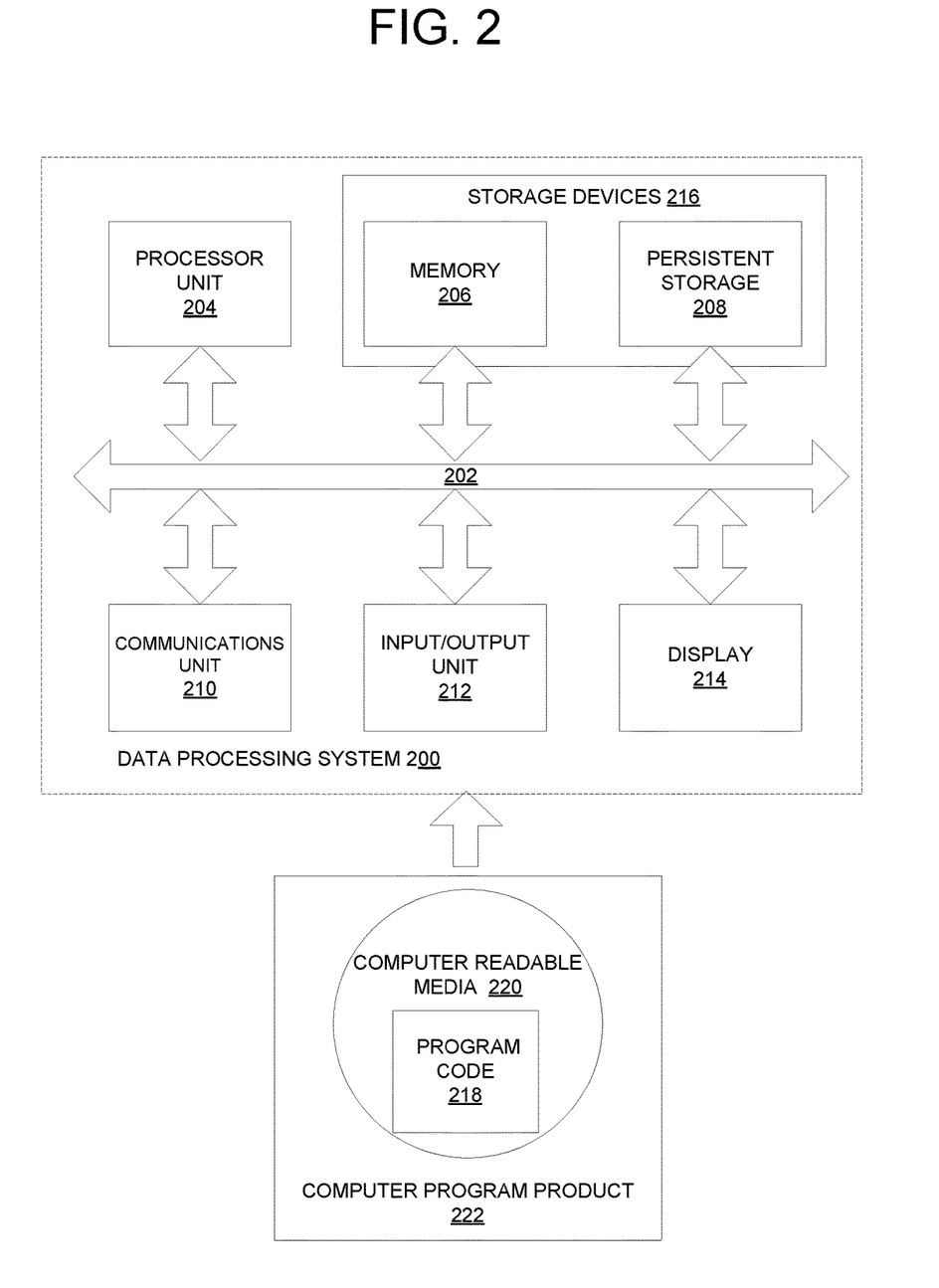
FIG. 2 is a block diagram of an exemplary data processing system operable for various embodiments of the disclosure.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference to FIG. 2 a block diagram of an exemplary data processing system operable for various embodiments of the disclosure is presented. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer-readable program code that may be read and executed by a processor in processor unit 204. The program code in the different embodiments may be embodied on different physical or tangible computer-readable storage media, such as memory 206 or persistent storage 208.

Program code 218 is located in a functional form on computer-readable storage media 220 that is selectively removable and may be loaded onto or transferred to data processing system 200 for execution by processor unit 204. Program code 218 and computer-readable storage media 220 form computer program product 222 in these examples. In one example, computer-readable storage media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable storage media 220 also may take the form of a persistent storage, such as a hard drive, a thumb drive, or a flash memory that is connected to data processing system 200. The tangible form of computer-readable storage media 220 is also referred to as computer recordable storage media. In some instances, computer-readable storage media 220 may not be removable.

Alternatively, program code 218 may be transferred to data processing system 200 from computer-readable storage media 220 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer-readable storage medium in a server data processing system may be downloaded over a network from the server to data processing system 200. The data processing system providing program code 218 may be a server computer, a client computer, or some other device capable of storing and transmitting program code 218.

Using an embodiment of the disclosed process associates each sessnav value with a respective HTML anchor from which the sessnav value was extracted. For example, given the following statements:

<a href="http://site.com/index?sessnav=1234">Home</a>
<a href="http://site.com/index?sessnav=9762">About Us</a>
<a href="http://site.com/index?sessnav=3242">Contact</a>

Using an embodiment of the disclosed process when the session refreshes, the statements are correctly updated as follows:

<a href="http://site.com/index?sessnav=ABDC">Home</a>
<a href="http://site.com/index?sessnav=LKJH">About Us</a>
<a href="http://site.com/index?sessnav=MNGF">Contact</a>

The scanner is capable of identifying a correct sessnav value for each link and the disclosed process appears to be more closely related to how a user interacts with a website because the user typically does not always see the link, rather the context of the link is considered. For example a home link on every page should bring a user back to the same page regardless of how the link appears. Use of an embodiment of the disclosed process also works correctly when the sessnav value is common to all the links and does not require a configuration of the scanner to identify sessnav as a changing value.

Use of an embodiment of the disclosed process which enables the scanner to identify session identifiers without requiring a configuration typically provides flexibility and efficiency to programmatic services including an automated crawler or scanner, from search engines to performance testers, and security scanners. Embodiments of the disclosed process may also be used to address redundancy issues when a link, which changes slightly, is to be considered the same.

Embodiments of the disclosed process describe a unified scheme for dynamically associating correct session information with HTTP requests for use in programmatic services including security testing. Embodiments of the disclosed process include heuristics derived from extracting context information; in particular, through logging in twice and using a delta of the login information to extract session information.

Using data processing system 200 of FIG. 2 as an example, a computer-implemented process for synchronizing requests with a respective context is presented. Processor unit 204, responsive to a determination that there are more pages to explore, performs regular crawling operations for a current page, records a current page in a list of explored pages in storage devices 216 and extract links from the current page to storage devices 216. Responsive to a determination that there are more links to extract, processor unit 204 selects a next link to analyze to form a selected link and responsive to a determination that there is a new request associated with the selected link, processor unit 204 creates a new request identifier and saves an entry in a hashmap in storage devices 216. Responsive to a determination that there is not a new request associated with selected link, processor unit 204 updates a request associated with the selected link in storage devices 216 with a new link value when the link value differs.

Figure 3:
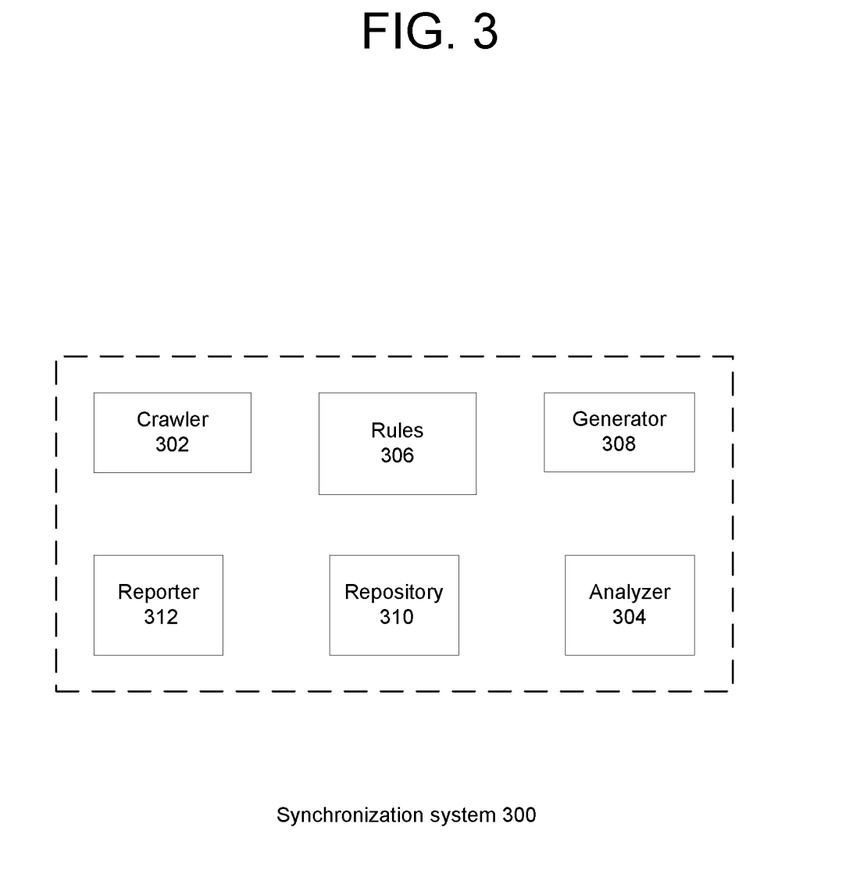
FIG. 3 is a block diagram representation of a synchronization system operable for various embodiments of the disclosure.

With reference to FIG. 3 a block diagram of a synchronization system operable for various embodiments of the disclosure is presented. Synchronization system 300 is an example of a system in an embodiment of the disclosed process.

Synchronization system 300 includes a number of components operations a functional unit leveraging underlying services of a data processing such as network data processing 100 of FIG. 1 or data processing system 200 of FIG. 2. Synchronization system 300 may be implemented as a collection of discrete components in an interdependent relationship in which the components are operatively coupled to exchange data or as a monolithic entity embodying the functional components without affecting the functional capability of the disclosed process.

Synchronization system 300 provides a capability of identifying equivalent JavaScript events using a collection of cooperative components including crawler 302, analyzer 304, rules 306, generator 308, repository 310 and reporter 312. Synchronization system 300 provides a package, which may be implemented as an enhancement to a current crawler or as a new function to an existing system. The example using a web crawler is one embodiment; alternative embodiments include a data explorer capability for analyzing data for example when indexing non-web based data. Accordingly the disclosed process is not restricted to use in only a web-based environment of the example.

Crawler 302 provides a capability of a conventional web crawler with an added ability to perform the added function of the disclosed process. In an embodiment the disclosed process is integrated within an existing web crawler, but as mentioned the function of a crawler with the disclosed process may be used in a non web-based environment equally well.

Analyzer 304 provides a capability of a parser and a comparator to examine provided data to identify links within an analyzed page or portion of code and determine whether equivalency of pairs of associated requests is present. A parser portion of analyzer 304 traverses input code to identify relevant information such as page links and associated request information. A comparator portion of analyzer 304 compares the portions of each request according to predefined criteria in rules 306. Rules 306 is a collection of specifications defining criteria under which equivalency is determined. Rules 306 provide specification of the individual conditions, which combine to define the equivalency requirement criteria against which the pairs of associated requests are evaluated. Rules 306 are used to determine during link analysis whether a request needs to be updated during testing, or whether the request needs to be updated during testing but the session identifier value is common to all the requests, in which case a difference can be updated from any response not only a previous response and whether there is always a need to re-obtain a previous page to obtain updated session information for the differences before the test.

Generator 308 provides a capability to create a data structure in the form of a hashmap using information associated with extracted requests being evaluated. Repository 310, maintained on storage devices 216 of FIG. 2, provides a capability to persist information used within the disclosed process and to contain results available to users of the disclosed process. Repository 310 provides a storage location for information associated with the disclosed process including for example, intermediate results, generated hashmaps, final results of identification and synchronization, and lists used with requests, extracted requests, and pages being tested.

Reporter 312 provides a capability to generate output of the results of the synchronization process of identification system 300 for use by others, including applications. For example, a simple list of synchronized requests may be made available or a path name for a location within a file or database instance pointing to the information of a result may be provided as required by an embodiment.

Figure 4:
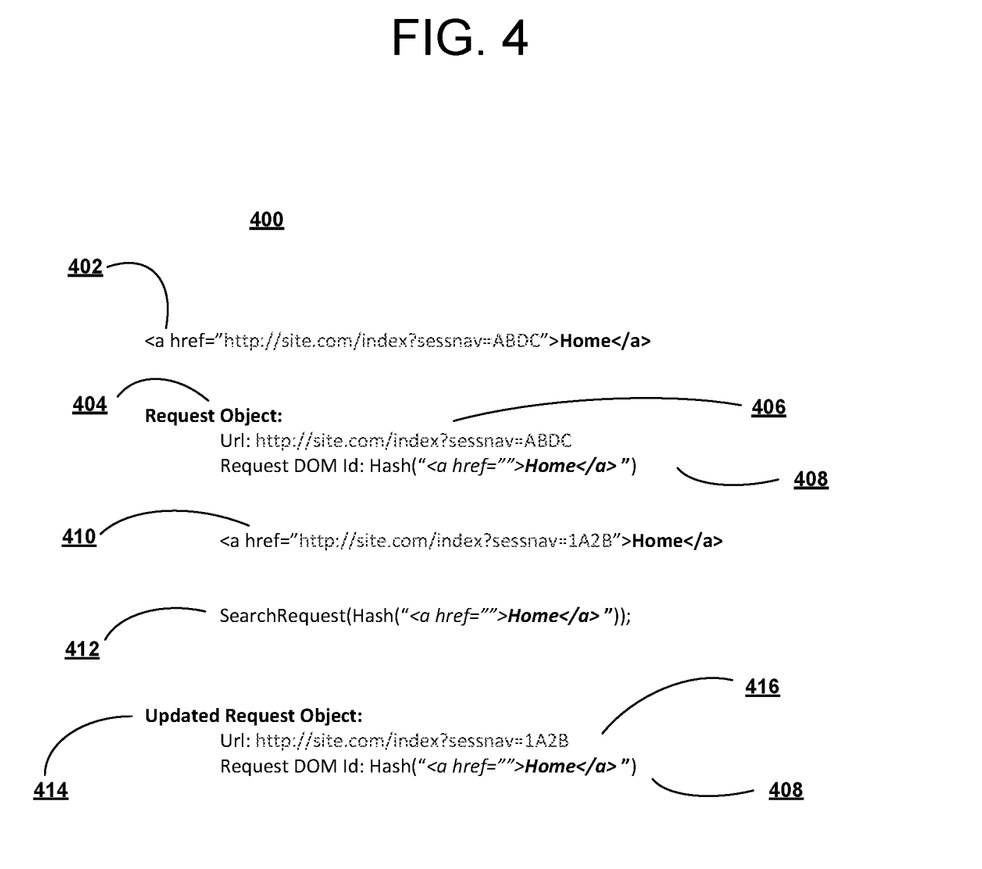
FIG. 4 is a textual representation of a code snippet representative of a synchronization operation operable for various embodiments of the disclosure.

With reference to FIG. 4 a textual representation of a code snippet representative of a synchronization operation operable for various embodiments of the disclosure is presented. Code snippet 400 is an example of a synchronization operation using an embodiment of the disclosed process of synchronization system 300 of FIG. 3.

When a crawler first constructs a request the request is uniquely identified by the document object model (DOM) element from which the request was extracted. In the example of code snippet 400 extracting a request from statement 402 results in request object 404. Request object 404 has URL portion 406 and request DOM id portion 408. When the crawler explores a new page and analyzes the page links of the new page, when a new instance of "Home" is found the request is updated with new link 410.

A search for the DOM Id of the link in the current set of requests is performed using search request 412. When a result of search request 412 is located, request object 404 is changed to create updated request object 414 with the new value in URL portion 416 and a same request DOM id portion 408.

The example presented may be easily generalized to other type of links including form submissions and JavaScript™ clicks.

Figure 5:
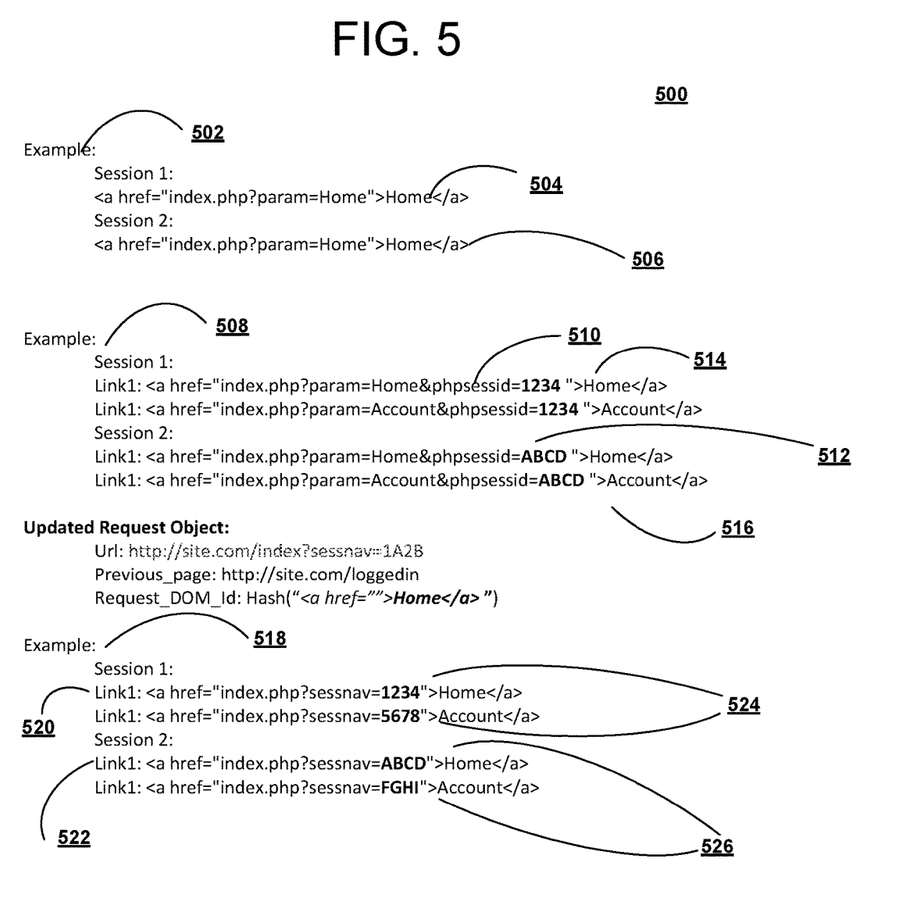
FIG. 5 is a textual representation of a code snippet representative of a repeated synchronization operation operable for various embodiments of the disclosure

With reference to FIG. 5 a textual representation of a code snippet representative of a repeated synchronization operation operable for various embodiments of the disclosure is presented. Code snippet 500 is an example of a repetitive synchronization operation using an embodiment of the disclosed process of synchronization system 300 of FIG. 3.

As shown in code snippet 400 of FIG. 4, an embodiment of the disclosed process functions as expected when pages being analyzed are visited once. However when testing a request, the tests have to be sent in sequential order. Proper sequencing is required because a value of a request is updated from a previous response. Accordingly there is a need to at least be able to revisit a page containing a link about to be resent.

Therefore a technique of updating an HTTP request using the DOM should be combined with a way of updating session identifiers where applicable. However being aware of a DOM context of every request in a page can also be very useful when optimizing which type of tracking should be used.

In example 502, when request 504 remains the same as request 506 across two different sessions (for example a user performs a logout and another login) then the request information does not require updating during testing.

In example 508 request 510 changes to request 512 between two sessions but the element that is different can be found in all the other requests then it means that the request needs to be updated during testing but that the session identifier value 514 and session identifier value 516 is common to all the respective requests. In this situation the element difference can be updated from any response and not only the previous response.

In example 518 when request 520 changes to request 522 between two sessions but the difference, between session identifier value 524 (which is different within a session) and session identifier value 526 (which is also different within a session) cannot be found in all other requests then the disclosed process re-obtains a previous page before the test. When a request for a previous page also changes between sessions then the disclosed process repeatedly re-sends a request of the previous page until the change can be resolved by traversing backward through the chain of pages.

Because the order of requests is important an embodiment of the disclosed process identifies which page contains the link of the originating request to enable updating of a request before each test is performed.

Figure 6:
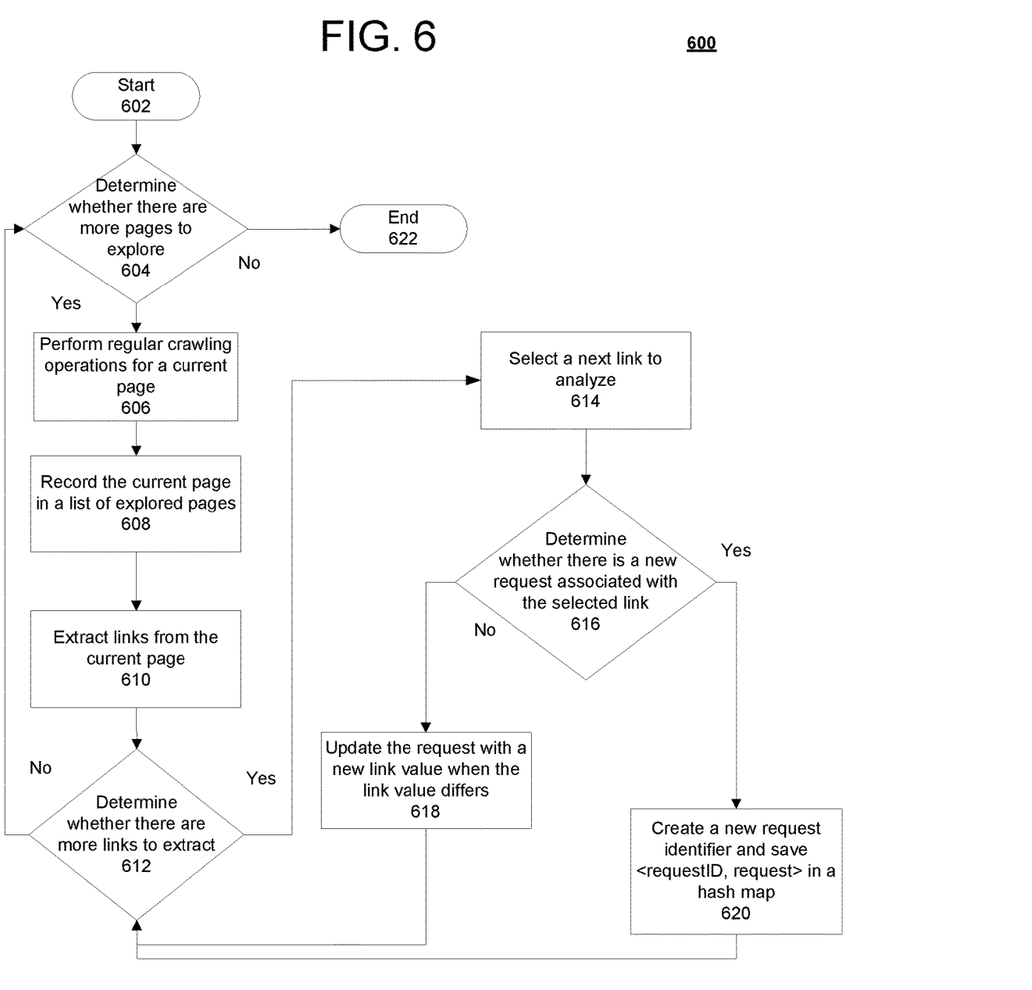
FIG. 6 is a flowchart of an exploration process using the synchronization system of FIG. 3 operable for various embodiments of the disclosure.

With reference to FIG. 6 a flowchart of an exploration process operable for various embodiments of the disclosure is presented. Process 600 is an example of an exploration or crawling process using an embodiment of synchronization system 300 of FIG. 3.

As can be seen in FIG. 6, a security module is not part of the flowchart. The security module may run in parallel with process 600 or after the exploration process completes. Regardless of when executed, a security module always consumes the updated requests from a hashmap created and maintained during a crawling or exploring process.

Process 600 begins (step 602) and determines whether there are more pages to explore (step 604). Responsive to a determination that there are no more pages to explore, process 600 terminates (step 622). Responsive to a determination that there are more pages to explore, process 600 performs regular, (conventional), crawling operations for a current page. Regular (conventional) crawling operations for a current page includes typical exploration and gathering of content and structure information. Process 600 records the current page in a list of explored pages (step 608). List of explored pages is a set of data maintained in a data structure for example as previously defined repository 310 of synchronization system 300 of FIG. 3.

Process 600 extracts each link identified from the current page (610). Analysis of the current page identifies each link on a page using known techniques typically used by exploration services and web site crawlers. Process 600 determines whether there are more links to identify during page analysis (step 612). Responsive to a determination that there are no more links to identify during page analysis process 600 loops back to perform step 604 as before.

Responsive to a determination that there are more links to extract during page analysis process 600 selects a next link to analyze (step 614). Process 600 determines whether there is a new request associated with the selected link (step 616). Responsive to a determination that there is a no new request associated with the selected link, process 600 updates the existing request with a new link value when the previous link information differs (step 618) and loops back to process step 612 as before. Responsive to a determination that there is a new request associated with the selected link, process 600 creates a new request identifier and saves a combination of <requestID, request> in a generated hashmap (step 620) and loops back to process step 612 as before.

Figure 7:
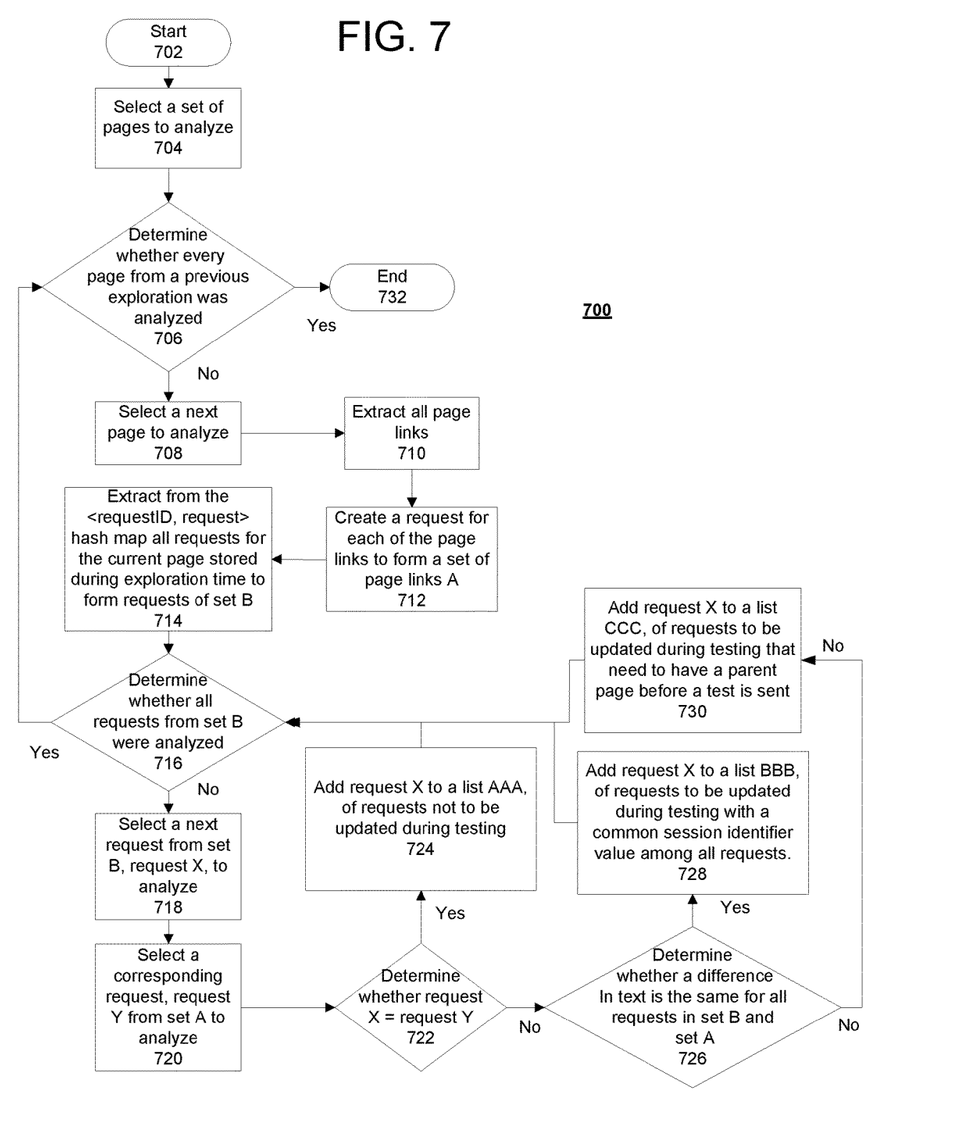
FIG. 7 is a flowchart of preprocessing for each page previously explored using the synchronization system of FIG. 3 operable for various embodiments of the disclosure.

With reference to FIG. 7 a flowchart of preprocessing for each page previously explored operable for various embodiments of the disclosure is presented. Process 700 is an example of a set of preprocessing operations, which are needed with each page processed during exploration, for example using the process described in FIG. 6. When exploration is performed in parallel with security testing, preprocessing operations occur incrementally for every page explored, and before requests belonging to the page tested. The preprocessing operations execute in a context of security testing, and therefore, preprocessing operations will run in a different session than a session used during exploration.

During a testing step, requests from the List AAA, List BBB and List CCC are treated as follows: for List AAA, the requests do not need to be updated during testing, for List BBB, the request needs to be updated during testing but the session identifier value is common to all the requests, in which case a difference can be updated from any response not only a previous response and for List CCC, there is always a need to re-obtain a previous page to obtain updated session information for the differences before the test.

If a request for a needed previous page also changes between sessions then there is a need to re-send a respective previous request. The re-sending is performed recursively until an initial request of the scan is reached, or to a request from List BBB or List AAA is obtained.

Process 700 begins (step 702) and selects a set of pages to analyze (step 704). Pages may be presented as part of a scan or a crawl of a web site. In another embodiment the pages represent documents, including typical files, objects or other forms of non-web data to be indexed.

Process 700 determines whether every page from a previous exploration was analyzed (step 706). Responsive to a determination that every page from a previous exploration was analyzed, process 700 terminates (step 732). Responsive to a determination that every page from a previous exploration was not analyzed, process 700 selects a next page to analyze (step 708). Process 700 obtains a next page from the set of pages previously selected. Pages may be provided in groups including logical collections of pages associated by origin or other categorization as needed or random selections including first in first out and individually.

Process 700 extracts all links from the current page being analyzed (step 710). Using the extracted links process 700 creates a request for each of the page links to form a set of page links A (step 712). Process 700 extracts from the <requestID, request> hashmap all requests for the current page stored during exploration time to form requests of set B (step 714).

Process 700 determines whether all requests from set B were analyzed (step 716). Responsive to a determination that all requests from set B were analyzed, process 700 loops back to perform step 706 as before. Responsive to a determination that all requests from set B were not analyzed, process 700 selects a next request from set B, as request X to analyze (step 718). Process 700 selects a corresponding request Y from set A, to analyze (step 720).

Process 700 determines whether request X is equivalent to request Y (step 722). Responsive to a determination that request X is equivalent to request Y, process 700 adds request X to a list, AAA, of requests not to be updated during testing (step 724) and loops back to perform step 716 as before. Responsive to a determination that request X is not equivalent to request Y, process 700 determines whether a difference in text is the same for all requests in set B and set A (step 726).

Responsive to a determination that a difference in text is the same for all requests in set B and set A, process 700 adds request X to a list, BBB, of requests to be updated during testing with a common identifier value among all requests (step 728) and loops back to perform step 716 as before. Responsive to a determination that a difference in text is not the same for all requests in set B and set A, process 700 adds request X to a list, CCC, of requests to be updated during testing that need to have a parent page before a test is sent (step 730) and loops back to perform step 716 as before.

Thus is presented in an illustrative embodiment a computer-implemented process for synchronizing requests with a respective context. The computer-implemented process responsive to a determination that there are more pages to explore, performs regular crawling operations for a current page, records a current page in a list of explored pages and extract links from the current page. Responsive to a determination that there are more links to extract, selects a next link to analyze to form a selected link and responsive to a determination that there is a new request associated with the selected link, creates a new request identifier and saves an entry in a hashmap. Responsive to a determination that there is not a new request associated with selected link, updates a request associated with the selected link with a new link value when the link value differs.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which includes one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer-readable data storage medium having computer executable instructions stored thereon in a variety of forms. Examples of computer-readable data storage media include recordable-type media, such as a floppy disk, a hard disk drive, a RAM, CD-ROMs, DVD-ROMs. The computer executable instructions may take the form of coded formats that are decoded for actual use in a particular data processing system.

A data processing system suitable for storing and/or executing computer executable instructions including program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A computer-implemented method of crawling a website, comprising:
    recording a current page in the website being crawled in a list of explored pages;
    extracting links from the current page;
    selecting a next link to analyze to form a selected link;
    determining whether a new request exists that is associated with the selected link; and selecting between:
        creating a new request identifier and saving an entry in a hashmap, and updating, in the hashmap, a prior request associated with the selected link, wherein the selecting is based upon the determining,
    wherein the creating the new request identifier is selected and is based upon no new request existing that is associated with the selected link.

2. The method of claim 1, wherein the prior request is updated with a new link value found in the new request.

3. The method of claim 1, wherein
    the updating the prior request is selected and is based upon the new request existing.

4. The method of claim 3, wherein
    the entry includes
        an association between the request and an HTML context of the request, and
        a requestID of the request.

5. The method of claim 3, wherein
    the updating includes updating an HTTP request from a DOM in combination with updating a session identifier.

6. A computer hardware system configured to crawl a website, comprising: at least one hardware processor configured to initiate the following operations:
    recording a current page in the website being crawled in a list of explored pages;
    extracting links from the current page;
    selecting a next link to analyze to form a selected link;
    determining whether a new request exists that is associated with the selected link; and
    selecting between:
        creating a new request identifier and saving an entry in a hashmap, and
        updating, in the hashmap, a prior request associated with the selected link,
    wherein
    the selecting is based upon the determining,
    wherein the creating the new request identifier is selected and is based upon no new request existing that is associated with the selected link.

7. The system of claim 6, wherein the prior request is updated with a new link value found in the new request.

8. The system of claim 6, wherein
    the updating the prior request is selected and is based upon the new request existing.

9. The system of claim 8, wherein
    the entry includes
        an association between the request and an HTML context of the request, and
        a requestID of the request.

10. The system of claim 8, wherein
    the updating includes updating an HTTP request from a DOM in combination with updating a session identifier.

11. A computer program product, comprising:
    a computer hardware storage device having stored therein program code,
    the program code for crawling a website, which when executed by a computer hardware system, causes the computer hardware system to perform:
    recording a current page in the website being crawled in a list of explored pages;
    extracting links from the current page;
    selecting a next link to analyze to form a selected link;
    determining whether a new request exists that is associated with the selected link; and
    selecting between:
        creating a new request identifier and saving an entry in a hashmap, and
        updating, in the hashmap, a prior request associated with the selected link,
    wherein
    the selecting is based upon the determining,
    wherein the creating the new request identifier is selected and is based upon no new request existing that is associated with the selected link.

12. The computer program product of claim 11, wherein the prior request is updated with a new link value found in the new request.

13. The computer program product of claim 11, wherein
    the updating the prior request is selected and is based upon the new request existing.

14. The computer program product of claim 13, wherein
    the entry includes
        an association between the request and an HTML context of the request, and
        a requestID of the request.

15. The computer program product of claim 13, wherein
    the updating includes updating an HTTP request from a DOM in combination with updating a session identifier.

* * * * *